M. F. McCARTHY.
CARBURETER.
APPLICATION FILED MAR. 4, 1903.
906,548.
Patented Dec. 15, 1908.
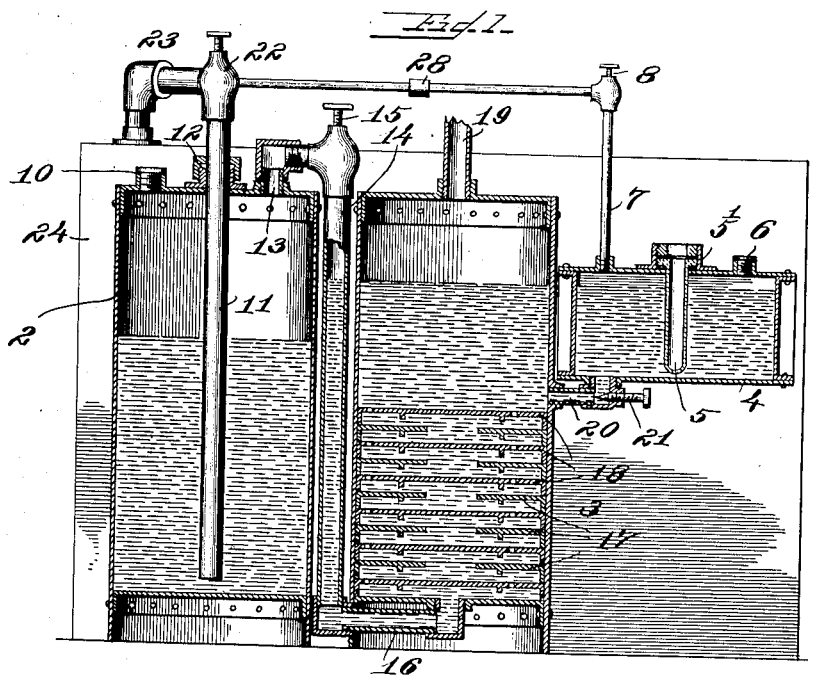
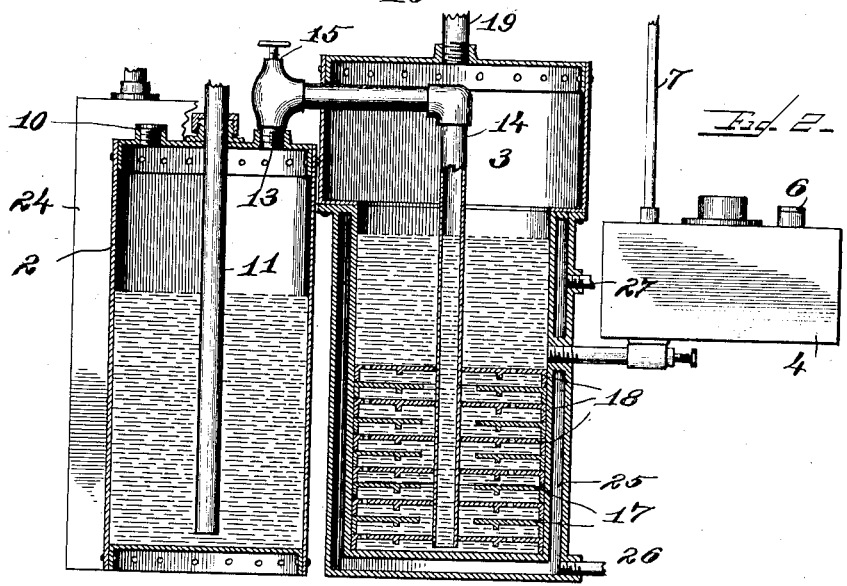
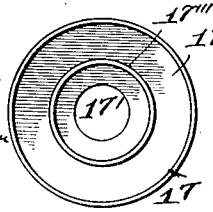
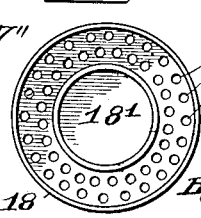

UNITED STATES PATENT OFFICE.

MITCHELL F. McCARTHY, OF CHICAGO, ILLINOIS.

CARBURETER.

No. 906,548.  Specification of Letters Patent.  Patented Dec. 15, 1908.

Application filed March 4, 1903. Serial No. 146,046.

*To all whom it may concern:*

Be it known that I, MITCHELL F. MCCARTHY, a citizen of the United States, residing at Chicago, in the county of Cook and State of Illinois, have invented certain new and useful Improvements in Carbureters, of which the following is a specification.

This invention relates to apparatus for the production of gas, and has particular reference to oil-gas machines, of the carbureting type, and is designed to provide a system of chambers or reservoirs, connections and appurtenances, the general objects of which are to provide for preliminary treatment or charging of the air to be carburized, to thoroughly dissipate the atoms of oil and air in the carburizing chamber, to provide storage-tank connections for the air and liquid supplies which shall facilitate recharging of the carburizing vessel, and to accomplish the above and other objects in the simplest, safest and most economical manner possible.

My invention consists, generally, in the employment with a carburizing tank or chamber of a volatile-liquid supply tank communicating therewith, an air-treating tank for preliminarily treating the air before admitting it to the carburizing tank, and an air storage chamber.

My invention further consists in novel means for controlling and directing the flow of air to and through the carburizing tank, and means for utilizing the original source of air supply to insure flow of the volatile liquid from the supply to the carburizing tank.

My invention further consists in various details of construction and combinations of parts as hereinafter described and particularly pointed out in the claim.

The invention will be more readily understood by reference to the accompanying drawings, forming a part of this specification, and in which, Figure 1 is a partly sectional elevation of an apparatus embodying my invention. Fig. 2 is a similar view of an apparatus provided with a modification of the air-pipe arrangement and a heating jacket for the carburizing chamber. Fig. 3 is a bottom plan of one of the series of baffle-plates. Fig. 4 is a similar view of the other form of baffle-plate.

Referring now to the drawings in detail, numeral 2 refers to the preliminary, air-treating tank, 3 to the carbureting tank proper, 4 to the liquid supply tank, 5 to a novel form of gage therein, 6 to the filler-opening, and 7 to a pressure-regulating air pipe, preferably provided with a suitable valve 8, and leading to said supply-tank 4 from the original source of compressed air. The treating tank 2 is provided with a liquid-supply inlet 10 and the air-supply pipe 11, entering the tank preferably through the stuffing-box 12 and terminating near the bottom of the tank. The air-outlet 13 communicates with the pipe 14, preferably having a suitable valve 15, which pipe 14, in one construction, communicates with the lower part of the carbureting chamber through the interposition of a pipe 16, and in the other construction directly.

The baffle-plates comprise a series of two sets of differently-formed, alternately-disposed disks 17 (Fig. 3) and 18 (Fig. 4), which will be hereinafter more fully described. A final gas-outlet pipe 19 leads from the top of the carbureting tank 3, and an oil-supply pipe 20 leads thereto from the oil-supply tank 4. The pipe 20 is preferably provided with a valve 21 by means of which the flow therethrough may be regulated. The original source of air supply is from the compressed-air storage tank 24, from which leads the main air-supply pipe 23, preferably valved at 22 to control the supply.

In Fig. 2 I have shown the carbureting tank 3 provided with a steam or hot-water jacket 25, supplied from any suitable source through the pipe 26, 27 referring to the outlet pipe. Any suitable source of hot water, vapor or steam supply and manner of circulation may be provided and the details thereof are immaterial so far as this invention is concerned.

I have referred to the tank 2 as an "air-treating" tank. I have discovered that air may be with good results prepared in many ways for the process of carburizing. This tank may contain water, through which the air is forced to remove small particles of solid matter, or it may contain an acid, such as sulfuric, which on account of its affinity for water will take up all moisture in the air, leaving the latter pure and dry and in better condition to absorb an hydro-carbonaceous vapor. Or the tank 2 may contain heavy oil drained from the main carbureter and deposited therein, thus partially carbureting the air in advance of its admission to the main carbureting chamber 3 which contains fresh oil. The contents of this tank 2, therefore, may vary with the character of the volatile liquid employed in the carbonizing chamber and the nature of the final product desired.

The tank 4, while apparently small in vertical section may represent a long, low tank of considerable larger capacity than the carbureting vessel 3, although, of course, its dimensions may be of any scope desired. The chief functions of this supply tank are to provide a vessel in which the oil level may be noted and regulated and a convenient part for refilling. The service of the gage-glass 5 is the reverse of that of the ordinary steam gage-glass employed with engine boilers, in that the gage is read from within. It is therefore made of somewhat larger diameter and held in a metal body 5' closed normally by a plug 5''. By providing the gage within the vessel, all dangers which might otherwise arise from breaking of the glass are avoided, the glass being completely incased within the tank by the plug 5'' on the gage-body 5'. When the oil level is to be noted, the plug is temporarily removed. As a further precaution, the valve 21 may be closed, in case the glass should be broken, as also the valve 8, if desired. This temporary closing would not materially affect the comparative oil levels in the tanks 3 and 4.

The pipe 7 to the tank 4 communicating directly with the source of compressed air supply, and the gas-pressure in the tank 3 being controlled indirectly, through the tank 2 and its connections, from the same source, and a substantially equal pressure being obviously necessary in the two tanks 3 and 4, I have shown a pressure equalizing or regulating valve 28, designed to insure a substantially uniform pressure in the tank 4 irrespective of the pressure in the compressed air tank 24. As this valve does not constitute an essential element of my invention, and is of common and well-known construction, it is not described in detail.

The steam or hot-water jacket 25, shown in Fig. 2, may or may not be employed. I have found that with its use a cruder oil may be employed for gas generation, the uniform and regulated heating of the oil due thereto facilitating the process of carburization and reducing the volume of residual by-products.

The operation of my invention is as follows: The several tanks or vessels having been filled with the proper liquids, substantially as shown in the figures, the valve 22 is opened admitting air into the lower portion of the tank 2, which air rises through the liquid in said tank, becomes suitably treated therein, and passes out through the pipe 14—the valve 15 being open—and is conveyed to the bottom of the tank 3 or below the lower baffle-plate therein. The treated air will first strike the imperforate or solid portion 18' of the plate 18 and be deflected thereunder to the apertures 18''. Passing through the apertures 18'' the now partially carburized air meets another obstruction in the imperforate or solid portion 17'' of the plate 17 next above. Deflected underneath the portion 17'', the air encounters the downwardly-projecting ridge or flange 17''', is deflected downwardly thereby and is finally allowed to escape through the central aperture 17' of the plate 17 to encounter, upon rising, another solid portion 18' of a plate 18, and so on, the plates, as previously stated, being arranged in alternate order. Each of these deflections or obstructions tends to break up the air bubbles formed, so that by the time the air issues into the upper or gas-storage portion of the chamber 3 it is thoroughly carbonized and united with the atoms of oil into a uniform gas compound. The pipe 19, or final outlet for the gas, is designed to be suitably connected with the distributing pipes provided with the usual stop-cocks.

During the above operation, the valve 21 will be normally open, permitting the flow of oil from the tank 4 to the carbureting vessel, the air-supply pipe 7 providing the necessary pressure to overcome the pressure of the gas in the chamber 3. In the absence of this pipe, the oil would have to be pumped or otherwise forced into the carbureter, as is the common practice. It is obvious that the pressure of the carburized air in the upper portion of the tank or vessel 3 will be considerably less than the original pressure in the pipe 11 and at the mouth thereof, owing to the resistance of the liquids which has been overcome; hence greater pressure must be provided through the pipe 11 than through the pipe 7, for which purpose I prefer to provide the valve 28, although the pressures may be equalized by means of the valves 8 and 22.

The compressed-air storage tank 24 may be of any desired size, form and location, and any common or usual means for compressing the air therein may be employed, so far as my invention is concerned. I have found it a material advantage to provide the steam or hot-water jacket 25, as stated, particularly where steam or hot-water facilities make its employment possible or convenient. The arrangement of the pipe 14 within or without the tank 3 is immaterial, and in either case the arrangement of the plates 17 and 18 is the same, no change being required in these plates other than the perforation of the plate 18 at its center to provide for the pipe 14, making the connection water tight, and making the aperture 17' in the plate 17 substantially larger than the diameter of the pipe 14.

Many modifications of the minor details of my improved gas-producing apparatus will doubtless readily suggest themselves to those skilled in the art to which it appertains, and I therefore do not desire to limit my invention to the specific construction and arrangements of parts herein shown and described.

Having thus described my invention, I claim as new and desire to secure by Letters Patent—

A gas producing apparatus comprising a carbureting chamber adapted to contain a supply of liquid hydrocarbon, a heating jacket around said carbureting chamber, a preliminary air treating chamber adapted to contain a supply of air treating fluid, a connection between the upper portion of the air treating chamber and the carbureting chamber, a hydrocarbon reservoir, a normally open valved connection between the hydrocarbon reservoir and the carbureting chamber, an air storage chamber, a pipe leading from the air storage to the treating chamber, the outlet end of said pipe being below the level of the liquid contained therein, a branch from said pipe to the hydrocarbon reservoir above the level of the fluid therein, and means whereby air will be supplied to the hydrocarbon reservoir under lower pressure than to the air treating chamber.

In testimony whereof I have hereunto set my hand in the presence of two subscribing witnesses.

MITCHELL F. McCARTHY.

Witnesses:
    A. G. STUBBS,
    J. W. BECKSTROM.